3 Sheets—Sheet 1.
C. A. TOWER.
CAR COUPLING.
No. 11,477.
Reissued Mar. 5, 1895.
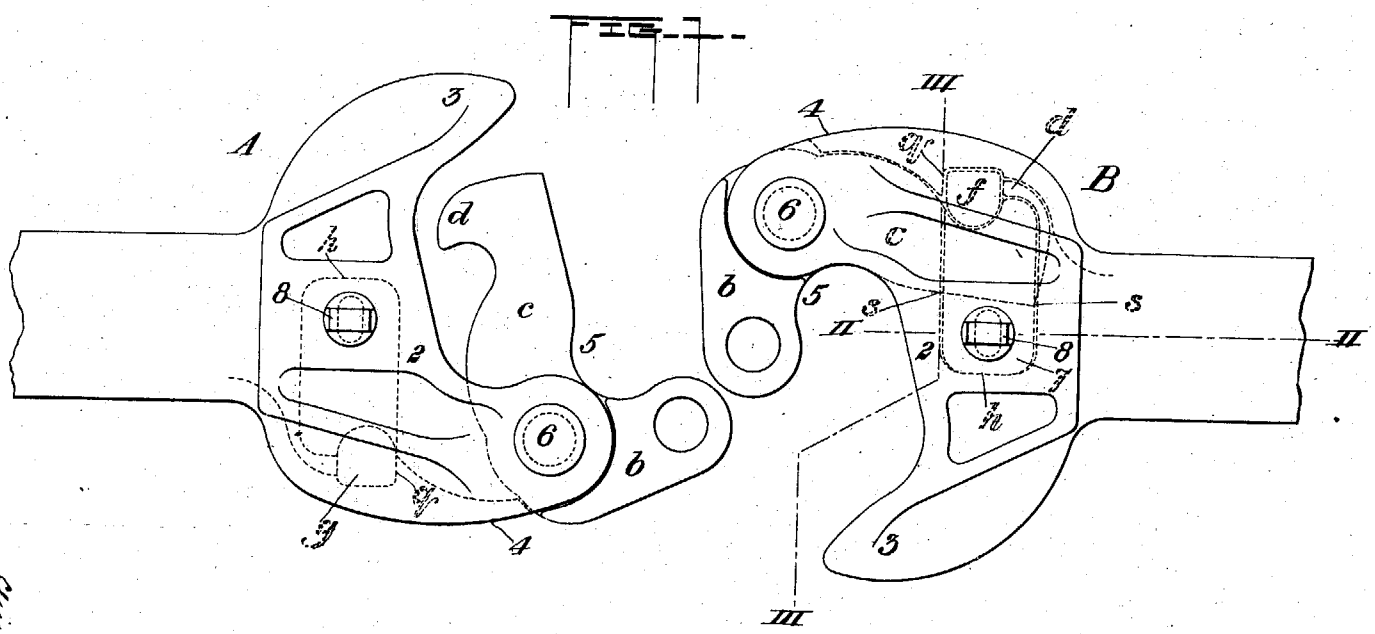
Witnesses
W. B. Corwin
H. M. Corwin
Inventor
Clinton A. Tower
by R. Bakewell & Son
his Attorneys C. A. TOWER.
CAR COUPLING.
3 Sheets—Sheet 2.
No. 11,477.
Reissued Mar. 5, 1895.
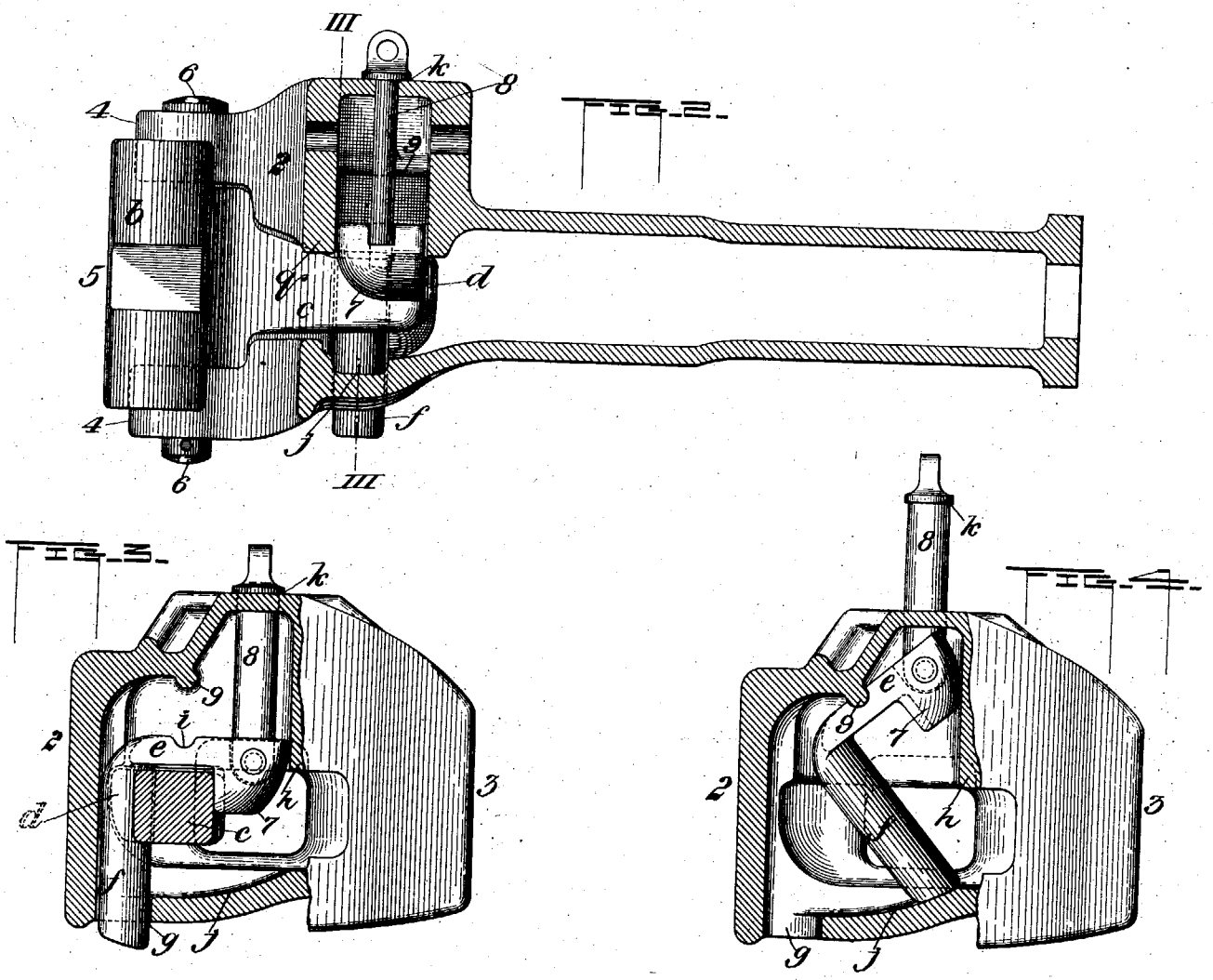
Witnesses
W. B. Corwin
H. M. Corwin
Inventor
Clinton A. Tower
by N. Bakewell & Son
his Attorneys.

3 Sheets—Sheet 3.

C. A. TOWER.

CAR COUPLING.

No. 11,477.

Reissued Mar. 5, 1895.

Witnesses

W. B. Connie

N. M. Corrin

Inventor

Clinton A. Tower by H. Bakewell Stone his Attorneys.

UNITED STATES PATENT OFFICE.

CLINTON A. TOWER, OF CLEVELAND, OHIO, ASSIGNOR TO THE NATIONAL MALLEABLE CASTINGS COMPANY, OF SAME PLACE.

CAR-COUPLING.

SPECIFICATION forming part of Reissued Letters Patent No. 11,477, dated March 5, 1895.

Original No. 507,511, dated October 24, 1893. Application for reissue filed January 3, 1895. Serial No. 533,782.

*To all whom it may concern:*

Be it known that I, CLINTON A. TOWER, of Cleveland, in the county of Cuyahoga and State of Ohio, have invented a new and useful Improvement in Car-Couplings, of which the following is a full, clear, and exact description, reference being had to the accompanying drawings, in which—

Figure 6:
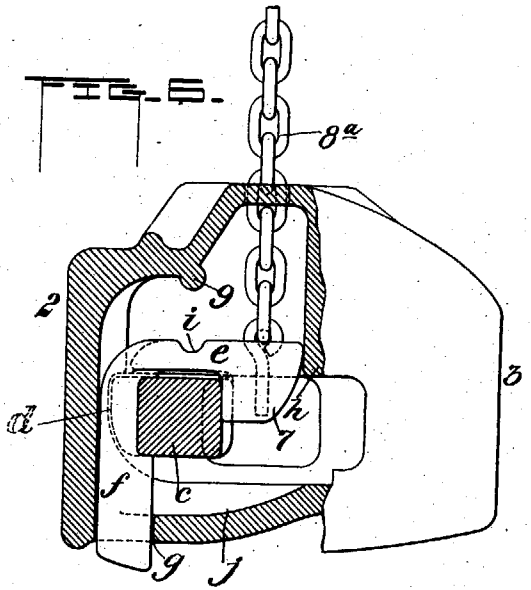
Figure 7:
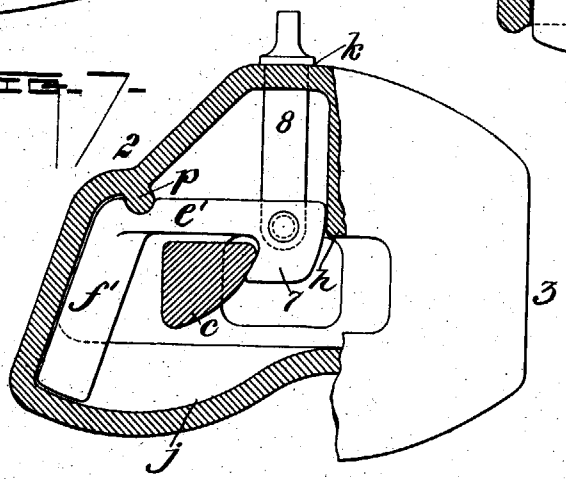
Figure 5:
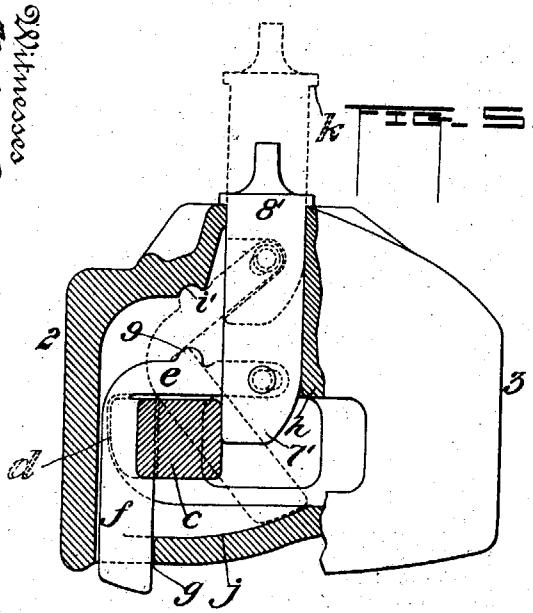

Figure 1 is a plan view showing two coupler-heads, A, B, constructed in accordance with my invention and having their parts in proper position to enable them to be coupled together. Fig. 2 is a vertical longitudinal section on the line II—II of Fig. 1, showing the knuckle when locked. Fig. 3 is a vertical cross section on the line III—III of Figs. 1 and 2, also showing the knuckle when locked. Fig. 4 is a view similar to Fig. 3, showing the angled piece in the position which it occupies when the knuckle has been unlocked, and has been thrown open. Figs. 5, 6 and 7 are cross-sectional views, similar to Fig. 3, showing modified constructions of the coupler.

My invention relates to that class of car-couplers known as twin-jaw couplers, in which the coupling-head has a swinging knuckle adapted to engage a similar knuckle in the coupler of another car; and its purpose is to provide improved means by which the knuckles can be locked in engagement with each other, and by which they can be opened into position for recoupling without need for the brakeman to go between the ends of the cars.

In the drawings, 2 represents the coupler-head, which, in general, may be of usual type. It has two jaws 3 and 4, and is provided with an internal cavity or recess, extending laterally into the jaw 4, and adapted to permit the coupling-knuckle 5 to swing upon its pivot-pin 6. This knuckle is formed with an outer arm *b*, and an inner and preferably longer arm or tail *c*, which project substantially at right angles to each other, and the rear side of the tail is formed with a hook *d*, the function of which I shall explain hereinafter. In order to hold the knuckle in locked position, (the position shown at B in Fig. 1) I employ an angled locking and opening piece set within the coupling-head, and shown most clearly on Sheet 2 of the drawings. The upper and transversely extending member or arm *e* of this angled piece reaches over the tail of the knuckle, its dependent block or head 7 is adapted to lock the knuckle when in closed position, and its dependent arm *f* extends downwardly at the rear of the knuckle. This arm is substantially upright when the knuckle is in locked position and passes through a hole *g* in the floor of the coupler. In the initial lifting hereinafter described, the hole acts as a guide to insure the vertical movement of the angled piece. When the knuckle is locked, the head 7 of the angled piece fits between the front side of the knuckle-tail and a shoulder *h* on the coupler-head, as shown in Fig. 3, but is lifted therefrom, when the angled piece is raised by a link or lifting rod 8, pivotally connected to it and extending through the coupler-head. This link is preferably formed with a shoulder *k*, which upholds the angled piece sufficiently to prevent actual contact of the member *e* with the top of the knuckle. When the knuckle is locked, as shown in Figs. 2 and 3, and at B in Fig. 1, the member *e* is above the tail of the knuckle, the head 7 fits in front of it and bears against the shoulder *h*, and the arm *f* of the angled piece fits within the hole *g* and is within the hook *d* of the tail. The angled piece is then braced by the fitting of its arm within the hole and by the bearing of its head 7 against the shoulder, and effectually prevents the knuckle from swinging open. When the knuckle is in locked position, and is being pulled upon by the draft of the cars, the hook *d* of the tail engages and bears against the arm *f*. Under these conditions, the arm *f*, being seated in the hole *g*, and being braced by a shoulder *q* of the coupler-head, against which the side of the arm bears, serves as a reinforced abutment. The strain on the pivot pin is thus relieved to such extent as to prevent its breaking or bending, and this construction has the further function of holding the knuckle when locked from being pulled from the coupler-head in case the pivot-pin should be removed or broken. In order to obtain the greatest strength and durability, I prefer to make the arm *f* of the angled piece of the cross-sectional shape shown in Fig. 1. As shown in that figure, the arm *f* is curved on the side next to the knuckle, and its other three sides are substantially plane and fit laterally within a vertical seat in the coupler-head. The consequence of this construction is that the arm *f* is held from rocking, turning, or rotating out of its seat, and is caused to perform its function as an abutment for the knuckle, as explained above.

To release the knuckle, and to permit it to be swung into the open position shown at A in Fig. 1, the brakeman raises the link 8, and thus lifts the angled piece above described until the end of its head 7 clears the tail of the knuckle and passes above the horizontal path of its motion, whereupon the knuckle can be swung open, either by hand or by the means described below. If the angled piece be not lifted far enough to raise the end of its arm *f* from the hole *g*, the dropping of the lifting link, after the knuckle has been swung open, will permit the angled piece to drop and to introduce its arm *f* vertically into said hole, whereupon the angled piece will assume the position shown in Fig. 3, except that the tail of the knuckle is then free from and in advance of the head 7. It is not necessary, for the mere purpose of locking and unlocking the knuckle, that the angled piece should be raised farther than as indicated in the last sentence, viz., just far enough to free the knuckle-tail, but not far enough to withdraw its arm *f* from the hole *g*, and therefore I may construct the recess in the coupler-head of only sufficient height to permit motion of this extent; but for reasons explained below I prefer to make the recess of such height that the angled piece shall be capable of considerably greater upward motion. The outer end of the head 7 of the angled piece may be beveled at its lower corner in the manner of a door-latch, as shown in Figs. 2 and 3; so that when the knuckle and angled piece are in the position last described, if the knuckle be swung back into locked position in the act of coupling with another car, the engagement of the tail with the beveled surface will raise the angled piece until the tail has passed beneath the head, whereupon the angled piece will drop by gravity into the position shown in Fig. 3, and will hold the knuckle as above explained.

In many prior car couplers of the general type to which my invention relates, it has been found that in use the pivot-pin 6 is sometimes bent forwardly by the severe strain put upon it, the effect of which is to displace the knuckle and to change the angle at which its front arm when locked projects from the jaw 4, causing it to tend toward the front of the coupler. Such displacement, if continued far enough, will render the coupler unsafe and often incapable of working. I prevent this by inclining the bearing between the locking side of the knuckle-tail and the head 7, as shown by the dotted line *s—s* on the coupler B of Fig. 1, making the inclination such that when the knuckle is pulled by the draft of the cars, as its axial center 6 moves forward, the wedge-like action of this bearing will tend to force the knuckle-tail inwardly, and will thus keep the front of the knuckle in constant position. This instruction I intend to claim broadly.

The locking device which I have just described is new in itself, and as it possseses important advantages of strength and durability, I intend to claim it, without limitation to other functions and features of construction. I have, however, adapted it to be used also for opening the knuckle in order to set it in proper position for coupling. The use of such angled piece, which as a single-acting device accomplishes the double function of rising to free the knuckle and of swinging radially to move it open without the accession of cams or levers, is distinctly new and is of great utility. The simplification of construction and the increased safety and durability of the coupler obtained by means of this single and individual body, with its unique attributes while at rest, and while in action, and which in the proper order, at the proper time and in a novel manner performs satisfactorily all the necessary functions of locking, unlocking and opening the knuckle, distinguish my invention practically from all prior devices known to me.

The vertical recess in the coupler-head is made of sufficient height to enable the angled piece, not only to be lifted far enough to clear the tail of the knuckle, but to move beyond this point sufficiently to clear the end of its arm *f* from the hole *g*. When in the act of unlocking the knuckle, the brakeman lifts the angled piece to its full extent, it first moves vertically until its arm *f* has left the hole, and then a notch *i* on the upper side of the member *e* engages a projecting rib or shoulder 9 on the coupler-head at the upper part of the recess, and in the further lifting, the bearing of the member-*e* upon this shoulder will cause the angled piece to tip radially in a vertical plane and to swing its arm *f* forwardly in a direction transverse to the length of the draw-bar, as shown in Fig. 4. The radial motion of the angled piece, bringing its rearwardly dependent arm into action upon the rear side of the tail of the knuckle, will move it outwardly by a positive action into the open position shown in Fig. 4 and at A in Fig. 1. In order to guide the angled piece and to brace it from lateral strain, I form in the base of the coupler-head a transverse groove *j*, in which the lower end of its arm moves. The base of this groove is preferably made on a curved or circular arc, whose center is the shoulder 9, since such construction prevents the angled piece from becoming displaced and jammed in the coupler-head; and when the angled piece is released after the knuckle has been opened, the end of its arm *f* will drop upon and be supported by the floor of the coupler within the groove. After the knuckle has been swung open and the lifting link 8 released, the angled piece remains in the position shown in Fig. 4 until the knuckle is swung back into locked position by the act of coupling or otherwise, whereupon the rear side of the tail of the knuckle will engage the arm *f* and will move the angled piece so as to carry the arm back toward a vertical position, until its lower end comes into register with the hole *g*, when the angled piece will drop by gravity, its arm *f* entering the hole, and its head 7 adjusting itself in front of the knuckle-tail, thus locking the knuckle, as shown in Figs. 2 and 3, and at B in Fig. 1.

For the purpose of raising the link 8, in order to effect the releasing and opening of the knuckle in the manner described above, I prefer to connect it by a chain, link, or other appliance with a tumbling crank-shaft which extends across the end of the car, and can be operated by the brakeman standing at the side of the track. Such appliances are well known.

The advantages of the invention will be appreciated by those skilled in the art. The apparatus is most simple, strong and reliable, and is so easy and effective in its operation that it overcomes the objections incident to many devices heretofore designed for the same general purpose.

Modifications in the form, construction and arrangement of the parts of the apparatus within the scope of the claims may be made by the skilled mechanic without variance from my invention. I show two such modifications in Figs. 5 and 6. In Fig. 5, instead of making the head of the angled piece (marked 7′) rigidly integral with the members *e*, *f*, I connect it directly to the member *e* by a pivot, and preferably make it of the same piece with the lifting link 8′, which then with advantage may be made wider and stronger than is shown in the other figure; but in this modification as in the others, the head of the angled piece is directly connected to the body portion. It forms a substantially integral part thereof, and moves equally and simultaneously with it. This unity of the locking and opening device consisting of a single angled piece with substantially integral head, body and tail, is, as I have already noted, a most important and distinctive feature of my invention. In Fig. 5 also, instead of the shoulder 9 on the coupler-head and the notch on the member *e* adapted to engage therewith, I show the shoulder or rib 9′ formed on the member *e* and the notch *i* formed on the coupler-head.

In Fig. 6 I show a coupler similar to that illustrated on Sheets 1 and 2 of the drawings, except that a chain 8ª is used instead of the rigid lifting link of the other figures. The use of the chain is for some reasons more desirable.

Within the scope of my invention as defined in the broader claims, the apparatus may be so modified that the angled piece, instead of being without fixed pivot as above described, is movable radially on a pivot in a vertical direction, and has no substantial initial lift independent of its radial motion. This construction, which for many reasons is less desirable than that described above, is shown in Fig. 7, in which the angled piece is pivoted at *p*. When the knuckle is locked, the head of the angled piece fits between the tail and shoulder *h*, and its arm *f′* extends downwardly back of the tail. The knuckle is released by turning the angled piece on its pivot, either by means of a lifting link, or by a crank applied to a pivot pin which may be used in place of the rib or shoulder, but the angled piece is made with the members *f′* and *e′* at such angle to each other that when it is turned, its head shall clear the knuckle, before the part *f′* engages the rear side of the tail. The further turning moves the knuckle open as explained with reference to the other figures; and as in the other forms of the coupler, I prefer to provide the base of the coupler-head with a transverse way or groove in which the angled piece is supported (when released) by the bearing of the lower end of its arm *f′* on the floor of the coupler-head.

I claim—

1. A coupler having a swinging knuckle, and an angled locking device, consisting of two members constituting a single angled piece, having a head adapted to fit between the knuckle and the coupler-head; one of said members or arms extending over the tail of the knuckle, and the other arm extending vertically back of the tail, said angled locking device having an initial vertical movement to disengage its head succeeded by a radial movement to open the knuckle; substantially as described.

2. A coupler having a swinging knuckle, and an angled locking device which extends over the tail of the knuckle within the coupler, the head of said locking device being adapted to fit between the knuckle and the coupler-head, its rear arm extending back of the tail of the knuckle and being adapted to enter and fit into a vertical hole or recess in the coupler-head, said locking device being pivoted to its lifting rod but not to the coupler, so that its initial vertical lift is succeeded by a tipping action of the angled piece when it comes in contact with the top of the coupler-head; substantially as described.

3. A coupler, having a knuckle, and a radially movable angled locking and opening device whose rear arm extends back of the tail of the knuckle, means for lifting said locking and opening device in a plane transverse to the direction of length of the draw-bar, and means for tipping it after such lifting motion has progressed sufficiently to unlock the knuckle; substantially as described.

4. A coupler, having a swinging knuckle, and locking and opening mechanism consisting of a single angled piece, whose head is directly connected to it and engages the knuckle when locked and whose arm extends vertically at the rear of the tail of the knuckle, said angled piece being set without fixed pivot in a recess in the coupler-head, wherein it is movable in a plane transverse to the direction of the length of the draw-bar, being capable of an initial vertical motion without substantial radial motion, in order to first free its head, and being adapted in its continued motion to engage a shoulder which causes it to turn radially in order to open the knuckle; substantially as described.

5. A coupler, having a vertically movable knuckle-opening device of angled form set without fixed pivot in a recess in the coupler-head, wherein it is movable in a plane transverse to the direction of length of the draw-bar, and having a part which extends in the rear of the knuckle's tail, means for lifting the opening device, and a notch and shoulder in the recess and on the opening device adapted to engage each other and to cause the knuckle to be swung radially after the lifting motion has begun; substantially as described.

6. An angled locking device for couplers, movable radially in a vertical plane and adapted to fit within the coupler-head over the tail of the knuckle and downwardly behind the same, said locking device having an integral head which, when the knuckle is locked, fits between the knuckle and the coupler-head; substantially as described.

7. A coupler having a knuckle, and a locking and opening device whose head is adapted to lock the knuckle, and which has an arm adapted to move the knuckle open, said device being movable radially in a vertical plane transverse to the direction of length of the coupler, and adapted to be supported by bearing of the arm at the base of the coupler-head when the knuckle is open; substantially as described.

8. A coupler, having a swinging knuckle, and an angled locking and opening device whose head engages the knuckle when locked and whose rear arm extends at the rear of the tail of the knuckle and fits within a guide-hole or recess in the coupler-head, when the knuckle is locked, said device being set without fixed pivot in a recess in the coupler-head, wherein it is movable in a plane transverse to the direction of the length of the draw-bar, and being capable of an initial vertical motion without substantial radial motion, in order to first free its head, and a shoulder in the recess adapted to engage said device in its continued motion and to cause it to turn radially in order to open the knuckle; substantially as described.

9. A vertically movable knuckle-holding pin having a lateral bearing in a vertical angular seat in the coupler-head, and having angular faces fitting within said seat, and a curved face fitting within a correspondingly-shaped recess in the knuckle; substantially as described.

10. In a car-coupler, a knuckle whose tail is provided with a lateral hook or shoulder, and a radially movable arm forming part of a locking device, and having a lateral bearing against the coupler-head, which arm (when the knuckle is in locked position) serves for said hook or shoulder to pull against, for the purpose of relieving the strain from the pivot of the knuckle; substantially as described.

11. An angled swinging coupler-knuckle, having the locking face of its tail longitudinally inclined at proper angle to match and fit a longitudinally inclined or wedge-bearing of a knuckle-locking device; substantially as described and for the purpose specified.

12. A coupling knuckle, having a locking block adapted to engage the side of the tail of the knuckle, said parts having a longitudinally inclined or wedge-bearing, the inclination being such as to force the tail inwardly and to correct the tendency of the knuckle when strained longitudinally to become displaced in direction; substantially as described.

In testimony whereof I have hereunto set my hand.

CLINTON A. TOWER.

Witnesses:
O. K. BROOKS,
D. W. CALL.